US007960887B2

(12) United States Patent
Trzynadlowski et al.

(10) Patent No.: US 7,960,887 B2
(45) Date of Patent: Jun. 14, 2011

(54) PERMANENT-MAGNET SWITCHED-FLUX MACHINE

(75) Inventors: Andrzej M. Trzynadlowski, Reno, NV (US); Ling Qin, Reno, NV (US)

(73) Assignee: Board of regents of the Nevada System of Higher Education, Reno, NV (US)

( * ) Notice: Subject to any disclaimer, the term of this patent is extended or adjusted under 35 U.S.C. 154(b) by 0 days.

(21) Appl. No.: 12/686,264

(22) Filed: Jan. 12, 2010

(65) Prior Publication Data

US 2011/0018383 A1 Jan. 27, 2011

Related U.S. Application Data

(63) Continuation of application No. 12/135,867, filed on Jun. 9, 2008, now Pat. No. 7,646,126, which is a continuation of application No. 11/679,806, filed on Feb. 27, 2007, now Pat. No. 7,385,330, which is a continuation of application No. 11/466,080, filed on Aug. 21, 2006, now abandoned, which is a continuation-in-part of application No. 11/069,619, filed on Feb. 28, 2005, now abandoned.

(60) Provisional application No. 60/548,703, filed on Feb. 27, 2004.

(51) Int. Cl.
*H02K 17/42* (2006.01)

(52) U.S. Cl. .................. 310/168; 310/156.01; 310/49 R
(58) Field of Classification Search ............... 310/49 R, 310/216, 261, 268, 156.01, 168, 171, 179–181
See application file for complete search history.

(56) References Cited

U.S. PATENT DOCUMENTS

| 4,206,374 | A | * | 6/1980 | Goddijn | 310/49.04 |
|---|---|---|---|---|---|
| 4,327,299 | A | * | 4/1982 | Goddijn | 310/49.04 |
| 5,369,324 | A | * | 11/1994 | Saether | 310/49.16 |
| 5,834,865 | A | * | 11/1998 | Sugiura | 310/49.11 |
| 2005/0062348 | A1 | * | 3/2005 | Ohnishi et al. | 310/49 R |
| 2006/0006744 | A1 | * | 1/2006 | Nashiki | 310/49 R |

* cited by examiner

*Primary Examiner* — Thanh Lam
(74) *Attorney, Agent, or Firm* — Holland & Hart LLP

(57) ABSTRACT

A permanent-magnet switched-flux (PMSF) device has an outer rotor mounted to a shaft about a central axis extending axially through the PMSF device. First and second pluralities of permanent-magnets (PMs) are respectively mounted in first and second circles, radially outwardly in first and second transverse planes extending from first and second sections of the central axis adjacent to an inner surface of the outer rotor. An inner stator is coupled to the shaft and has i) a stator core having a core axis co-axial with the central axis; and ii) first and second pluralities of stator poles mounted in first and second circles, radially outwardly from the stator core axis in the first and second transverse planes. The first and second pluralities of PMs each include PMs of alternating polarity.

5 Claims, 5 Drawing Sheets

COIL A

COIL B

COIL C

PERMANENT-MAGNET SWITCHED-FLUX MACHINE

CROSS-REFERENCE TO RELATED APPLICATIONS

This application is a continuation application of U.S. patent application Ser. No. 12/135,867, filed Jun. 9, 2008, which is a continuation of U.S. patent application Ser. No. 11/679,806, filed Feb. 27, 2007, which is a continuation application of U.S. patent application Ser. No. 11/466,080, filed Aug. 21, 2006, which is a continuation-in-part application of U.S. patent application Ser. No. 11/069,619, filed Feb. 28, 2005, which claims the benefit of U.S. Provisional Patent Application No. 60/548,703, filed Feb. 27, 2004, the contents of all of which are hereby incorporated herein by reference.

STATEMENT REGARDING FEDERALLY SPONSORED RESEARCH OR DEVELOPMENT

The United States Government has a paid-up license in this invention, and the right in limited circumstances to require the patent owner to license others on reasonable terms, as provided for by the terms of contract No. ACL-3-32455-07 awarded by the National Renewable Energy Laboratory (NREL).

TECHNICAL FIELD

The technical field relates generally to permanent-magnet (PM) generators.

BACKGROUND

As the need for energy constantly increases while fossil fuel reserves continue to dwindle, renewable energy sources are rapidly gaining importance. Renewable energy can be obtained using solar, geothermal, or wind-turbine technology. Although significant research has been made into each of those areas, prior art designs have typically not yielded the compact, economical, and efficient generators needed for, among other things, renewable energy sources (e.g., wind turbines).

Rotating electrical machines—both generators and motors—are devices that transform mechanical power into electrical power, and vice-versa. A rotating electrical machine generally includes a magnetic field and an armature that rotate with respect to each other. In doing so, the armature is the part of the machine in which the energy conversion takes place.

In rotating direct current (DC) machines, the magnetic field (provided by the "stator") often is static and the armature rotates within it (the rotor). In rotating alternating current (AC) machines, the armature typically is stationary and the magnetic field rotates with respect to the armature. The armature generally has windings, which are conductors that are move with respect to the magnetic field in order to produce a voltage. The armature winding is usually placed on the stator.

DC machines once were widely employed in the industry and commonly were easily controlled by supply voltage adjustment. At this point in time, AC motors were not widely employed because they typically require frequency changes that are usually difficult to accomplish. With advances in power electronics and microprocessors, however, precise frequency control became more easily achievable in AC motors. As a result, AC motors generally have replaced or superseded DC motors, which are relatively expensive and usually require frequent maintenance. AC electricity also is easier than DC to distribute widely and utilize in a wide range of applications.

In AC machines generally, electromotive force (EMF) is generated when magnetic flux linking armature winding changes in time. The amount of EMF is proportional to the number of turns of the winding and the time derivative of the flux. The resulting torque is a result of forces produced in individual conductors of the armature winding when the winding is linked by magnetic flux and carries the armature current. For the torque to maintain one direction, the armature current must alternate with the same frequency as that of the magnetic field.

AC motors, for example, are typically built in a single or three-phase arrangement of the winding in which EMF is generated. In such AC machines, current also flows in the armature winding, thereby producing the electromagnetic torque. The associated voltage and current are typically referred to as armature voltage and armature current respectively. In a typical AC motor, EMF opposes the armature current and the torque causes the motion of the rotor.

AC generators, for example, typically have a permanent magnet that rotates inside a coil in such a way that the N-pole and S-pole alternate as seen from the coil. The speed of rotation determines the number of cycles per second, or frequency, usually measured in Hertz (Hz). A rotation speed of 3000 revolutions per minute (RPM), for example, produces 50 Hz, and 3600 RPM produces 60 Hz. In a typical AC generator, EMF causes the flow of armature current while torque opposes the motion of the rotor.

Certain AC generators and motors, called synchronous machines, are commonly used as generators for large power systems, such as turbine generators and hydroelectric generators in a grid power supply. A synchronous machine generally refers to a machine whose speed is directly proportional to the frequency of voltage produced in it, or supplied to it. In the former case, the machine operates as an AC generator, and in the latter as an AC motor. The generated armature EMF and voltage and, in presence of an electrical load, the armature current, then alternate with the same frequency. In an AC motor, the armature winding usually must be linked by an alternating flux and carry an armature current of the same frequency as that of the flux. For an AC machine to work as a synchronous generator, the magnetic flux linking the armature winding usually must alternate with the frequency proportional to the rotor speed. While a three-phase synchronous machine can work as both a generator and a motor, a single-phase machine can only work as a generator.

The progress in technology of high-energy rare-earth permanent-magnets (PMs) has spawned a large number of types of PM electrical machines, in which the required magnetic flux is produced by one or more PMs. In such machines, the PMs can either replace electromagnets in traditional designs, or novel topologies can be developed to make the best use of the properties and characteristics of PMs.

PM machines generally have a multiple stationary pieces (stators) and rotating pieces (rotors). The rotors usually contain many permanent magnets arranged such that their poles alternate in polarity. Each stator typically has windings that are arranged into two sets, and a distributor cycles current to the sets so that each set reverses polarity each successive time it is charged. Such construction permits the use of both poles of the magnets to provide driving forces.

PM machines typically have high full-load efficiency, high output power per volume, high starting torque (in motors), and their maintenance is limited to periodic lubrication of the bearings. The main drawback of PM machines is their incapacity of under-excitation, which may reduce the low-load efficiency. Also, the price of PMs is still relatively high.

Newer PM machines, whose structures are different from conventional PM machines, have been proposed. Some PM machines have transverse flux (TF) paths, meaning that flux paths are parallel to the rotor axis and not perpendicular to the rotor axis as in classic synchronous machines. A TF PM design can provide a substantial increase in the number of magnetic poles, substantially increasing the frequency-to-speed ratio. Consequently, TF motors often can run slowly, with a high torque, while a TF generator often can be driven by a slow prime mover, such as a wind turbine, still producing high output frequency. High frequencies of wind-turbine generators connected to the grid through a matching transformer are necessary for minimization of the transformer size. In the case of both TF motors and generators, a gearbox may not be required. TF machines are currently used in industry as well as in various vehicles, aircraft, and military equipment.

Commutated-flux generators (CFGs) have also been proposed in recent years. A CFG typically has a single permanent-magnet on a stator, a single coil on the stator, an AC flux linkage of a stationary coil, axial flux paths, non-reversible flux in the stator, an outer rotor, and stator/rotor interaction that is typical for variable-reluctance machines. A CFG usually can be classified as an outer-rotor, single-coil, permanent-magnet, variable-reluctance generator, with an operating principle similar to that of flux-reversal machines. In this design, the permanent-magnet is stationary, and the AC flux linkage of the coil is obtained by switching the flux paths instead of rotating a PM rotor.

CFGs typically have a high and readily-varied number of magnetic poles and thus provide a high frequency-to-speed ratio. CFGs typically provide a single coil with a low number of turns, low copper losses as a result of a thick coil wire, low iron losses from flux reversal in the switches only, and effective air-cooling properties because their switches may double as fan blades. CFGs typically have, however, a high potential for excessive flux leakage and fringing as well as use of large air gaps between the pole rings to reduce leakage between them. These gaps also decrease the power density.

A first version of a CFG (CFG-1) has a single permanent-magnet employed as a source of the magnetic field. Numerous flux conductors distribute the magnetic flux. Half of the conductors are in contact with the north pole of the magnet, so that they have positive polarity and half of the flux conductors are in contact with the south pole, so that they have negative polarity. A number of flux switches are distributed around the periphery of a tubular rotor housing the stator. The switches are sigmoid-shaped flat pieces of steel, which make and break contacts between the flux conductors to alternately open and close a magnetic circuit for the flux. The reversal of polarity of the magnetic flux induces an alternating EMF in the stator coil placed in a channel cut in the flux conductors. Tens of flux conductors can be accommodated on the stator, so even a low rotor speed results in a high frequency and a high voltage EMF in the coil. The CFG-1 design has a prohibitive amount of leakage flux. When the stator is assembled, the north-pole conductors are interspersed with south-pole conductors and their relatively large area and small gap provide low-reluctance leakage paths for the magnetic flux. As a result, only a small amount of flux remains to link the stator coil.

A second version of a CFG (CFG-2) has a structure different than the arrangement of interspersed north and south pole flux conductors of CFG-1. The major components of a CFG-2 include a rotor housing, an assembly of flux switches, a circular permanent-magnet with radial MMF orientation (e.g., north pole outside and south pole inside), a north laminate (e.g., an assembly of north pole tooth-like flux conductors, a stator coil, and a south laminate). Like the CFG-1 design, however, the CFG-2 design has many issues. For example, the power generated is low and the amount of leakage, most of which takes place between unaligned poles, is large.

Another problem with the CFG-2 design arises from the large gaps for reduction of leakage flux. As a result of these gaps, the generator is "loosely packed," creating a significant amount of unused free space inside the generator. In addition, because the armature coil occupies a small fraction of the machine volume, most of which is filled with iron in order to redirect flux, the CFG-2 provides reduced power density.

Yet another issue with CFG machines is their high cogging torque, which is typical of permanent-magnet single-phase machines generally. The cogging torque is often particularly high in serrated-pole designs with a small but expansive air gap between the stator and rotor. For example, a strong wind is typically required to start a CFG-based wind turbine, rendering operation unreliable at best.

With regard to three phase CFG machines, a three-phase CFG generator can be assembled as a stack of three single-phase generators. In contrast with the classic synchronous machines having periphery-distributed poles and windings, however, the axial arrangement of these components in a three-phase CFG would make it excessively long and bulky.

As noted above, flux leakage can be a significant problem for rotating electrical machines. Flux leakage is flow of flux out of a magnetic material, such as the wall of a pipe, into a medium with lower permeability, such as gas or air.

Curbing the phenomena of flux leakage and armature reaction has been particularly difficult in the design of PM synchronous AC machines. In addition, because ideal conductors or insulators do not exist in any practical sense, only a fraction of the total flux generated in the PMs effectively links the armature winding, while the rest of the flux leaks elsewhere closing through other parts of the machine. The armature reaction consists in the armature current producing its own magnetomotive force (MMF), which opposes the flux coming from the PMs. As a result of both the leakage and armature reaction, the armature voltage decreases with the increase in the current drawn from a generator. A motor with strong armature reaction and high leakage requires higher voltage to produce a given current and torque than that with weak armature reaction and low leakage.

As also discussed above, the need for renewable energy is increasing as traditional fuels become depleted and expensive. Environmental concerns also play an important role in stimulating research on renewable energy sources (e.g., wind turbines). In many applications (e.g., wind-turbine systems or vehicular drives), a high frequency-to-speed ratio is required to allow direct (e.g., gearless) mechanical connection between the generator and prime mover or the motor and load.

SUMMARY

The present application relates to a permanent-magnet switched-flux (PMSF) device. Some exemplary single-phase PMSF devices can operate as alternating current (AC) generators, while some exemplary multi-phase PMSF devices can operate as either an AC generator or an AC motor.

Certain embodiments improve generation of voltage and torque in AC electrical devices using permanent-magnets (PMs) as the source of magnetic flux.

Certain embodiments can provide or utilize low rotational speed of a rotor with respect to a stator while still providing or utilizing relatively high-frequency alternating current.

Certain embodiments can be manufactured and maintained relatively easily, with relatively few components.

Certain embodiments can be quite economical to both manufacture and use.

Certain embodiments may provide all the advantages noted above.

In certain embodiments, a PMSF machine has a rotor mounted about a central axis extending axially through the PMSF device. The PMSF machine may have: (i) a first plurality of permanent-magnets mounted in a first permanent magnet circle radially outwardly in a first transverse plane transverse to a first section of the central axis adjacent to an inner surface of the rotor; (ii) a second plurality of permanent-magnets mounted in a second permanent magnet circle radially outwardly in a second transverse plane transverse to a second section of the central axis adjacent to the inner surface of the rotor; and (iii) an inner stator mounted about the central axis. The inner stator may have: (i) a stator core with a core axis co-axial with the central axis; (ii) a first plurality of stator poles mounted in a first stator pole circle radially outwardly from the stator core axis in the first transverse plane; (ii) a second plurality of stator poles mounted in a second stator pole circle radially outwardly from the stator core axis in the second transverse plane. In certain embodiments, the first and second pluralities of permanent-magnets each have permanent magnets of alternating polarity from one permanent-magnet to an adjacent permanent-magnet.

In certain embodiments, a PMSF device may have a ferromagnetic outer stator mounted to a shaft about a central axis extending axially through the PMSF device, a first plurality of permanent-magnets mounted in a first permanent magnet circle radially outwardly in a first transverse plane extending transversely from a first section of the central axis adjacent to an inner surface of the ferromagnetic outer stator, a second plurality of permanent-magnets mounted in a second permanent magnet circle radially outwardly in a second transverse plane extending transversely from a second section of the central axis adjacent to the inner surface of the ferromagnetic outer stator, and a ferromagnetic inner rotor coupled to the shaft. The ferromagnetic shaft comprises a rotor core having a core axis co-axial with the central axis, a first disc having a serrated outer edge comprising 12 top rotor poles mounted in a first rotor pole circle radially outwardly from the rotor core axis in the first transverse plane, and a second disc having a serrated outer edge comprising 12 bottom rotor poles mounted in a second rotor pole circle radially outwardly from the rotor core axis in the second transverse plane. In such embodiments, the first and second pluralities of permanent-magnets each comprise permanent magnets of alternating polarity from one permanent-magnet to an adjacent permanent-magnet.

In certain embodiments, a PMSF device may have a ferromagnetic outer stator mounted to a shaft about a central axis extending axially through the PMSF device, a plurality of top stator poles mounted in a first rotor pole circle radially outwardly in a first transverse plane extending transversely from a first section of the central axis adjacent to an inner surface of the ferromagnetic outer stator, a plurality of bottom stator poles mounted in a second permanent magnet circle radially outwardly in a second transverse plane extending transversely from a second section of the central axis adjacent to the inner surface of the ferromagnetic outer stator, and a ferromagnetic inner rotor coupled to the shaft. The ferromagnetic shaft comprises a rotor core having a core axis co-axial with the central axis, a first disc having an outer edge comprising a first plurality of permanent magnets mounted in a first permanent magnet circle radially outwardly from the rotor core axis in the first transverse plane, and a second disc having an outer edge comprising a second plurality of permanent magnets mounted in a second permanent magnet circle radially outwardly from the rotor core axis in the second transverse plane. In such embodiments, the first and second pluralities of permanent magnets each comprise permanent magnets of alternating polarity from one permanent-magnet to an adjacent permanent-magnet.

In certain embodiments of a single-phase PMSF device, magnetic flux can be produced by an even number of PMs attached to an inner surface of a tubular ferromagnetic rotor. The PMs can be grouped into two circular sets, each close to one end of the rotor. Adjacent PMs can have alternating polarities. Thus, in such a PMSF device, if one magnet has the N-pole on the side coupled to the rotor surface, the next magnet has the S-pole on the same side. Considering the mutual arrangements of PMs belonging to different sets, the corresponding magnets (e.g., ones that can be connected by a straight line parallel to the rotor's axis) have differing polarities as well. Each of the two edges of a spool-shaped ferromagnetic stator, desirably mounted inside the rotor, is serrated into a number of stator poles p, which is equal to half of the number of PMs. When the rotor revolves around the stator, the stator poles, whose faces move close to the surfaces of the PMs, generally make low-reluctance paths for magnetic fluxes generated by the magnets. The fluxes desirably merge in the central core of the stator, around which the stator winding is arranged. Because of the alternating polarities of the PMs, the flux in the stator core is typically continuously switched into alternating directions, inducing an AC EMF in the winding. The direction of flux changes p times per revolution of the rotor, so that the desired high frequency-to-speed ratio is desirably obtained.

In certain embodiments, a PMSF apparatus comprises a wind turbine assembly coupled to a shaft, and a plurality of PMSF devices.

In certain embodiments, an n-phase PMSF device can be built from n axially stacked single-phase PMSF devices, with their shafts and rotors combined into a single shaft and a single rotor. Both single-phase and multi-phase machines can work in generator mode, while there are generally two phases in a PMSF motor. If the coils of a multi-phase PMSF device are supplied from an external electrical source, a torque is usually generated between the stator and rotor.

Simplicity of certain of the disclosed PMSF design allows for a large armature winding to be accommodated within the stator, so that large amounts of electrical or mechanical power can be generated. The space within the device can be, if desired, well-utilized, with only minimum air gaps. Therefore, high values of power density can be attained.

The foregoing Summary recites various features and advantages of various embodiments of the invention. It is to be understood that all embodiments need not necessarily include all such features or provide all such advantages or address the issues noted in the background. It is also to be understood that there are additional features and advantages of certain embodiments, and they will become apparent as the specification proceeds.

BRIEF DESCRIPTION OF THE DRAWINGS

Illustrative embodiments of the invention are illustrated in the drawings, in which.

DETAILED DESCRIPTION

Figure 1:
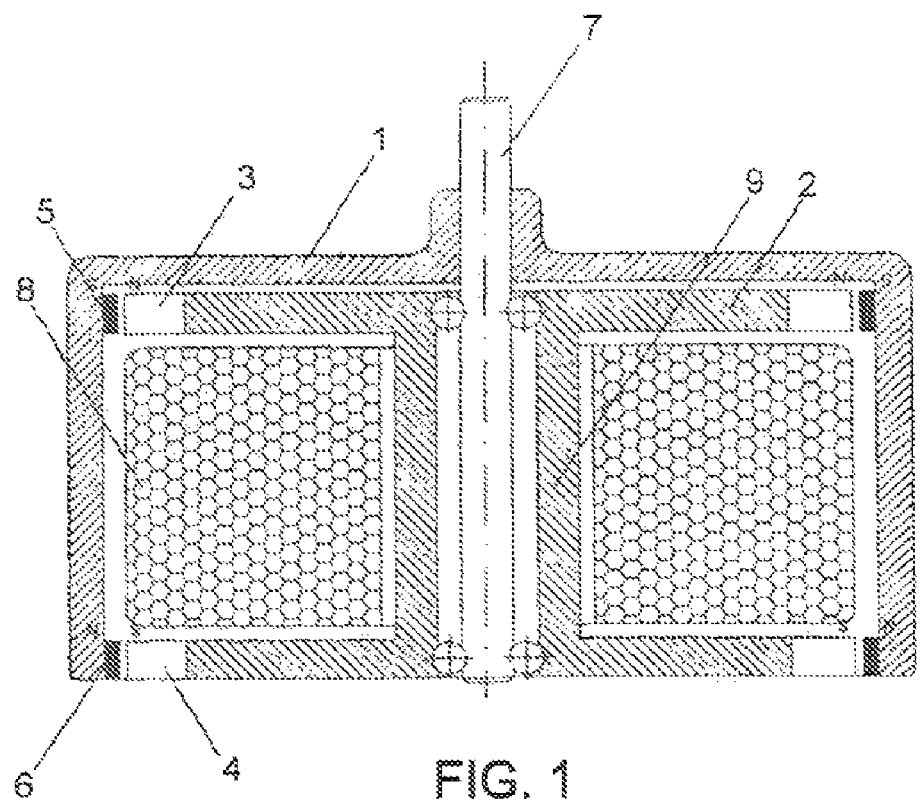
FIG. 1 is an axial cross-sectional view of an exemplary embodiment of a single-phase permanent-magnet switched-flux (PMSF) device having a ferromagnetic outer rotor.
Figure 2:
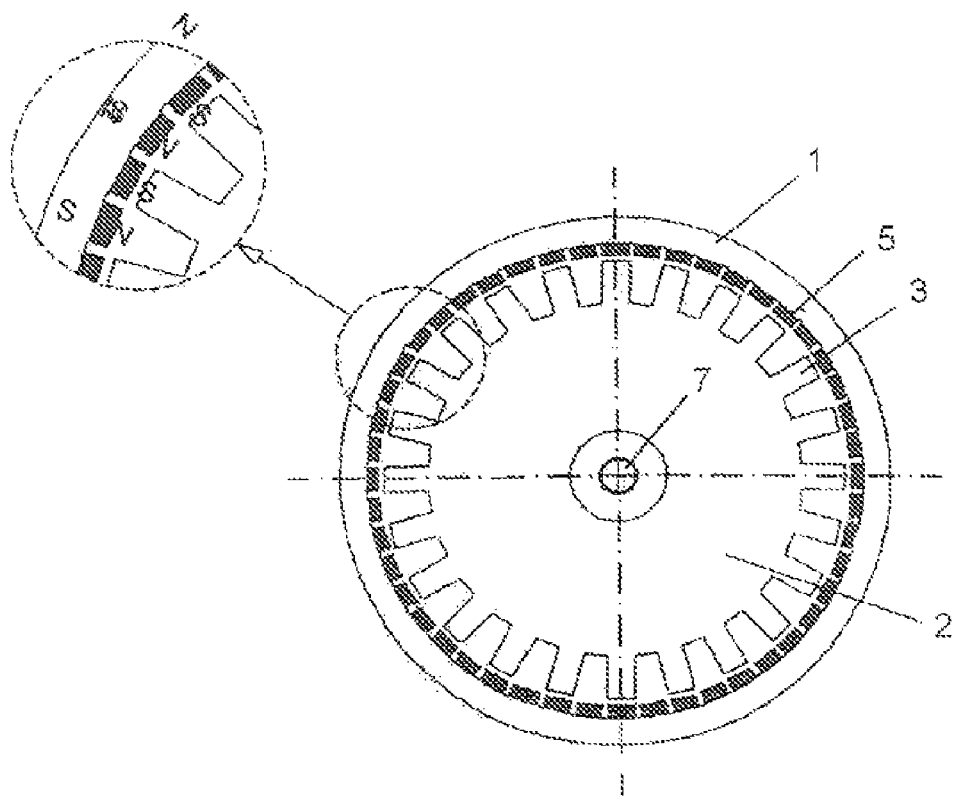
FIG. 2 is a radial cross-sectional view of the exemplary PMSF device of FIG. 1.

The axial cross section of a single-phase 24-pole (an example number) PMSF machine, which operates in generator mode, is shown in FIGS. 1 and 2. Tubular ferromagnetic outer rotor 1 revolves around ferromagnetic inner stator 2, which has the shape of a spool with the edges serrated into a number of stator poles 3 and 4. There are 24 top poles 3 and 24 bottom poles 4. The faces of stator poles 3 and 4 move close to permanent magnets 5 and 6 attached to the inner surface of rotor 1 parallel to the axis of the machine. There are 48 top magnets 5 and 48 bottom magnets 6. Letters "S" (S-pole side) and "N" (N-pole side) indicate their polarities. One of skill in the art will readily recognize that the number of poles and number of magnets can both vary. For example, in another embodiment, a PMSF device has 12 top poles and 12 bottom poles, as well as 24 top magnets and 24 bottom magnets.

Rotor 1 is driven by an external prime mover, e.g., a wind turbine, via shaft 7. In FIG. 1, position of rotor 1 is such that the top stator poles 3 are aligned with those top magnets 5 that have the N-pole on the stator side, and the bottom stator poles 4 are aligned with those bottom magnets 6 that have the N-pole on the rotor side. As a result, magnetic flux produced by magnets 5 and 6 shown on the left-hand side of FIG. 1 closes in a clockwise loop through the center of coil 8 constituting the armature winding. The path of this flux loop leads through the top magnets 5, top air gaps between stator poles 3 and magnets 5, top stator poles 3, stator core 9, bottom stator poles 4, bottom air gaps between poles 4 and magnets 6, bottom magnets 6, and the part of rotor 1 between magnets 5 and 6. The total flux in stator core 9 links coil 8 and generates an armature EMF.

When rotor 1 revolves by half of the pole pitch, 360°/p, where p denotes the number of stator poles (here 24), in either direction, stator poles 3 and 4 become aligned with magnets 5 and 6 of opposite polarity, switching the flux linking the coil 8 to the opposite direction. Thus, when rotor 1 revolves, the flux alternates with the frequency equal the product of number of stator poles 3 and the rotor speed expressed in revolutions per second. For example, if the 24-pole machine in FIG. 1 is driven with the speed of 600 r/min, which corresponds to 10 r/s, the flux frequency is 12 H 10=120 Hz. The armature EMF and, if the generator is loaded, the armature current, have the same frequency.

Figure 3:
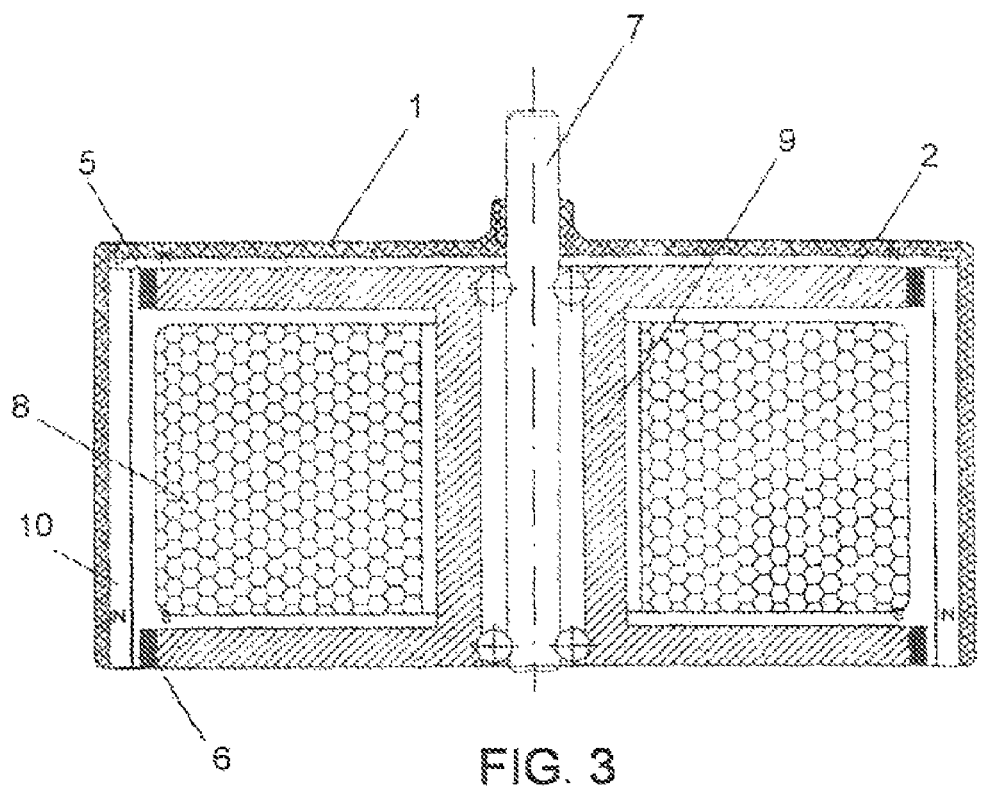
FIG. 3 is an axial cross-sectional view of an exemplary embodiment of a single-phase permanent-magnet switched-flux (PMSF) device having a non-ferromagnetic outer rotor.
Figure 4:
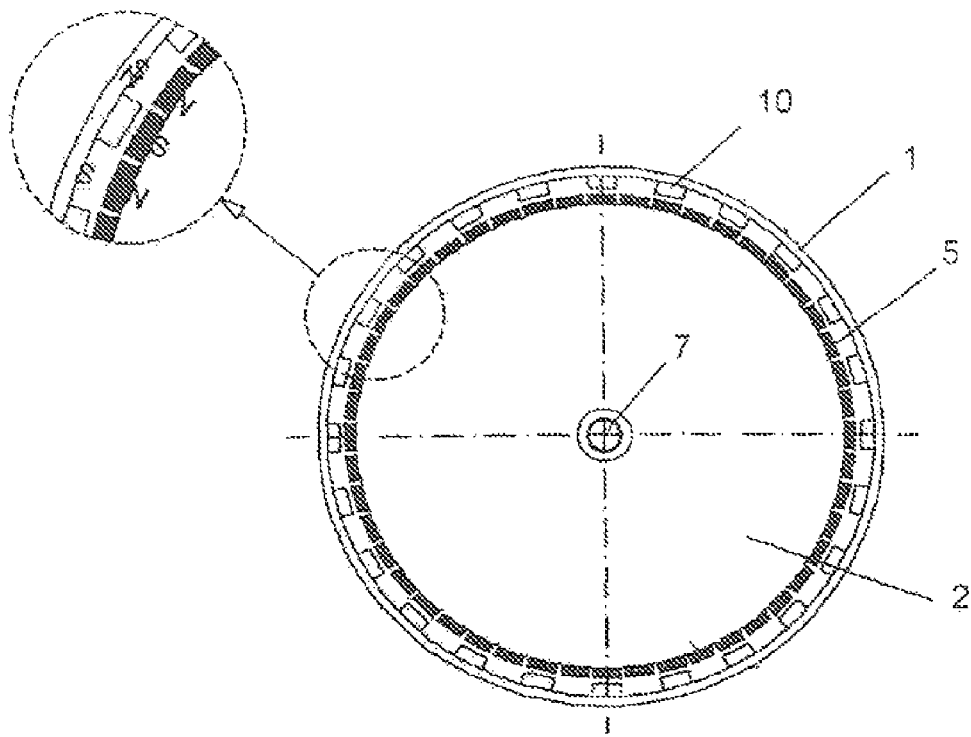
FIG. 4 is a radial cross-sectional view of the exemplary PMSF device of FIG. 3.

Other configurations of the PMSF machine of the present invention are feasible. A PMSF machine with a coil 8, a non-ferromagnetic outer rotor 1 attached to shaft 7, and permanent magnets 5 and 6 on a stator 2 having a stator core 9 is illustrated in FIGS. 3 and 4. Axially-oriented, long ferromagnetic stator poles 10 are attached to the inner surface of rotor 1.

Figure 5:
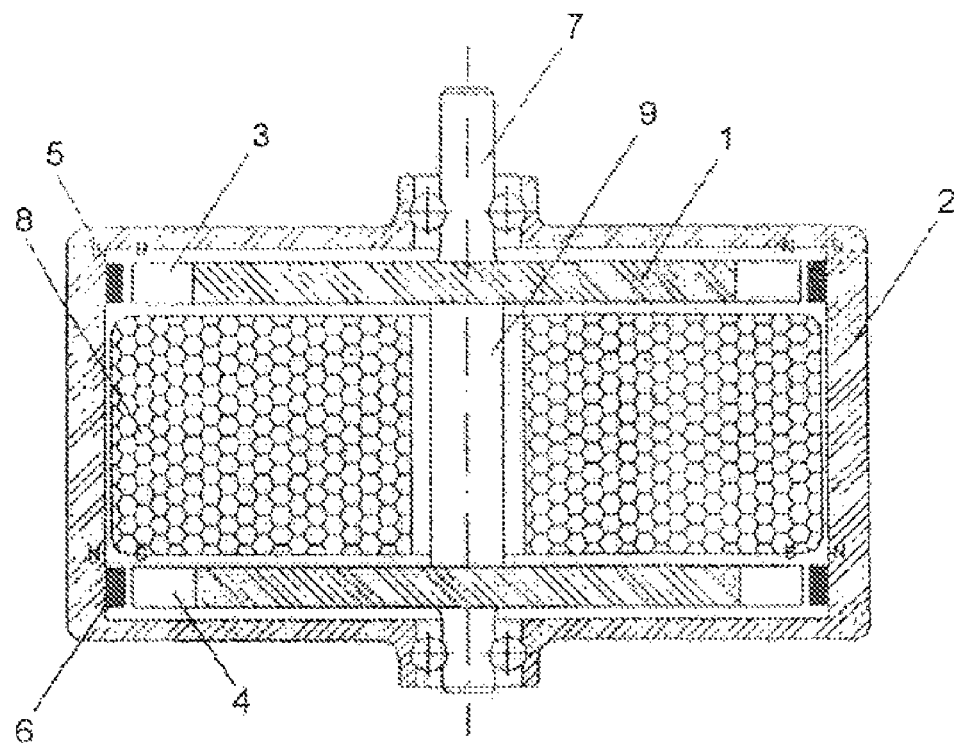
FIG. 5 is an axial cross-sectional view of a first exemplary embodiment of a single-phase permanent-magnet switched-flux (PMSF) device having an inner rotor.
Figure 6:
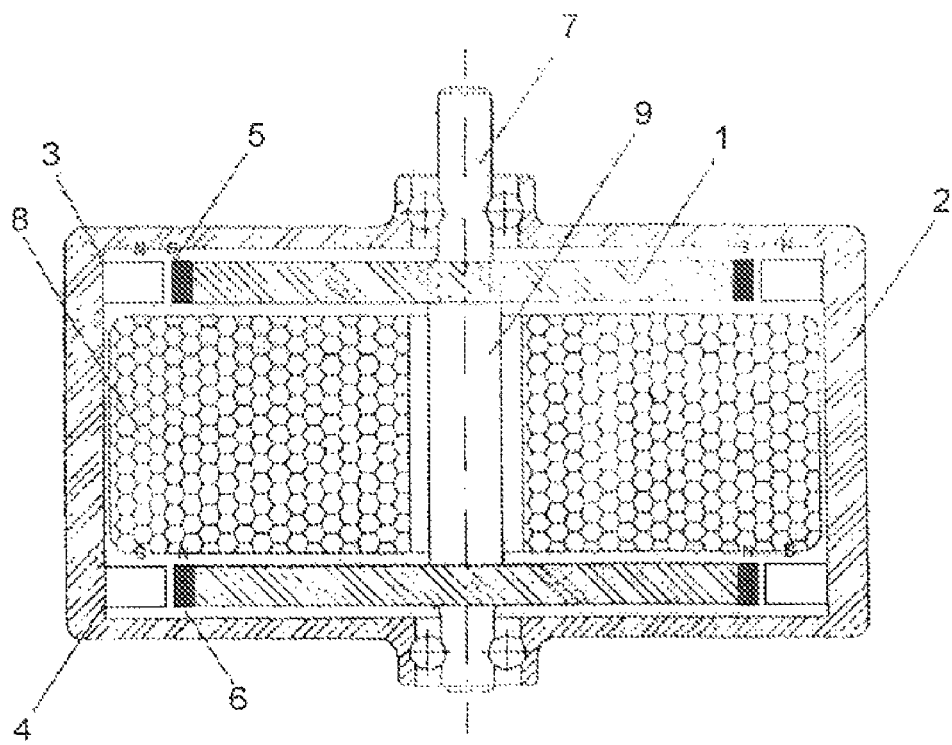
FIG. 6 is an axial cross-sectional view of a second exemplary embodiment of a single-phase permanent-magnet switched-flux (PMSF) device having an inner rotor.

Electromagnetic structures functionally identical to those in the described outer-rotor machines can be obtained by inner-rotor PMSF machines, as shown in FIGS. 5 & 6. The inner-rotor PMSF machine of FIG. 5 has a tubular ferromagnetic inner rotor 1 that revolves inside of a ferromagnetic outer stator 2, which is attached to a shaft 7 and encloses both the inner rotor 1 and a coil 8. The inner rotor 1 includes two discs having edges serrated in a number of rotor poles 3 and 4. The faces of the rotor poles 3 and 4 rotate adjacent to permanent-magnets 5 and 6 couples to the inner surface of the outer stator 2 parallel to the axis of the machine. The inner-rotor PMSF machine shown in FIG. 6 is similar to the inner-rotor PMSF machine shown in FIG. 5, but for the positions of the permanent-magnets 5 and 6 and poles 3 and 4. That is, in the PMSF machine shown in FIG. 6, the inner rotor 1 has a number of permanent-magnets 5 and 6 on the edges of its discs, and the permanent-magnets 5 and 6 rotate adjacent the faces of stator poles 3 and 4 on the inner surface of the outer stator 2.

Figure 7:
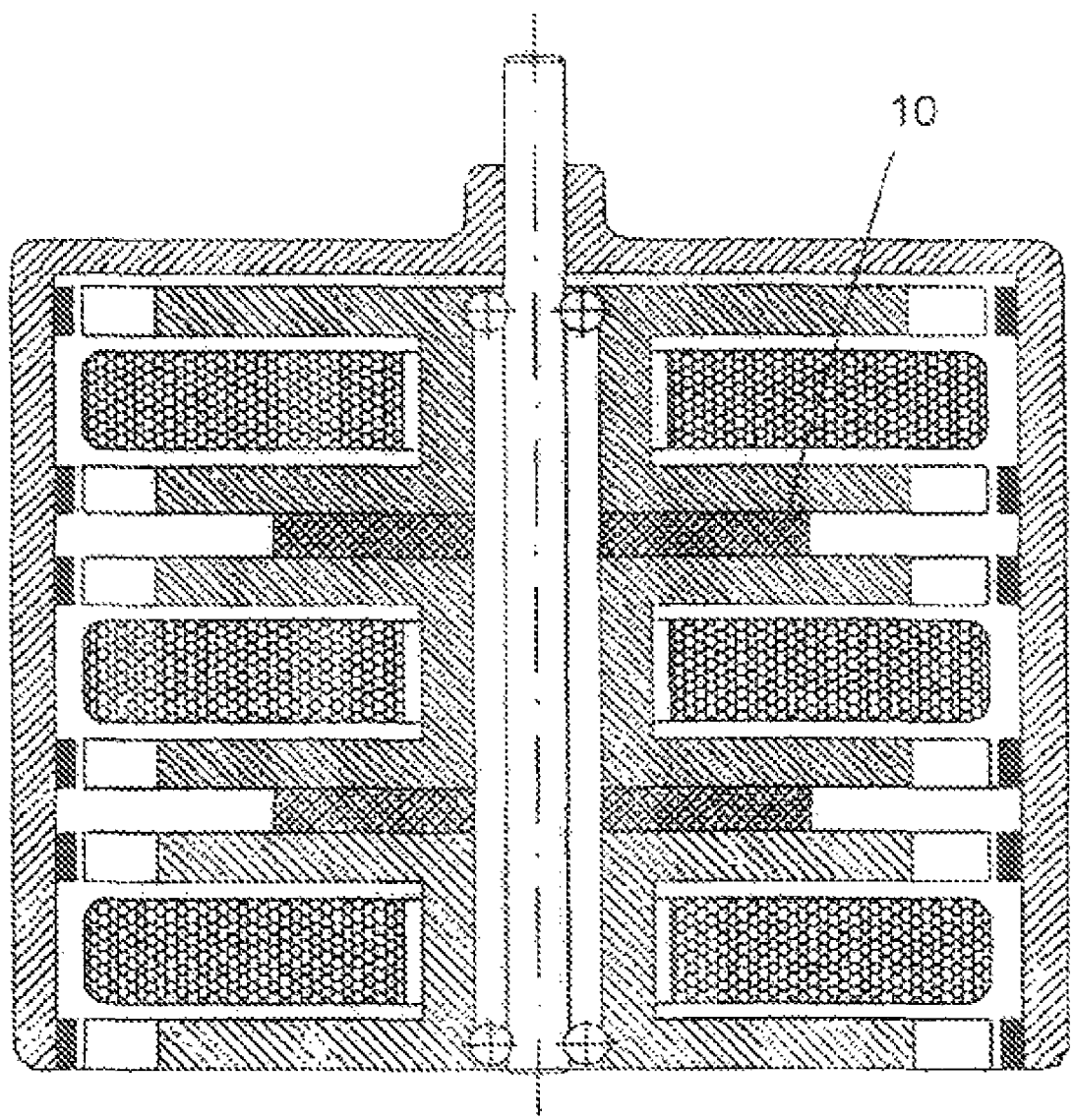
FIG. 7 is an axial cross-sectional view of a first exemplary embodiment of a three-phase permanent-magnet switched-flux (PMSF) device having a ferromagnetic outer rotor.
Figure 8:
FIG. 8 is a cross-sectional view of an exemplary arrangement of permanent-magnets in a three-phase permanent-magnet switched-flux (PMSF) device.
Figure 8:
Figure 8:
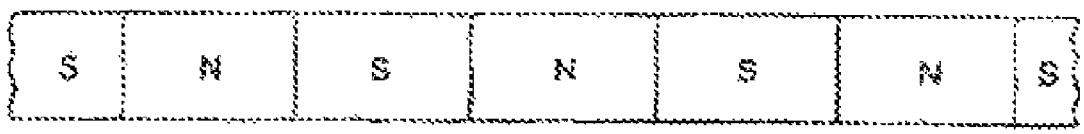
Figure 8:
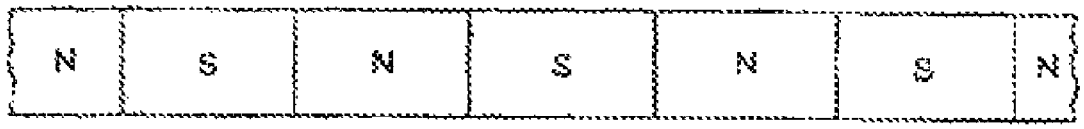
Figure 8:
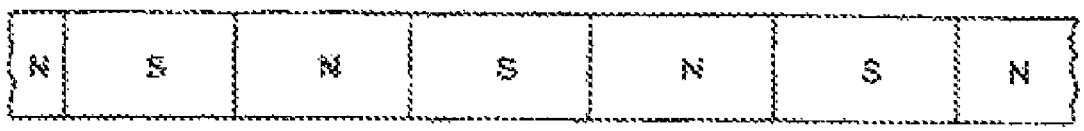
Figure 8:

PMSF machines can also be built in multiphase versions, which can work both as generators and motors. A three-phase PMSF with a ferromagnetic outer rotor is shown in FIG. 7. Comparing this design with that in FIG. 1, it can be seen that an n-phase PMSF constitutes a stack of n single-phase PMSFs with the common shaft and stator (or rotor, in an inner-rotor case). Ferromagnetic stator parts of adjacent phases are mechanically connected, and magnetically isolated with non-ferromagnetic inserts 10. As illustrated in FIG. 8, the magnet pattern for each of the single-phase parts of an n-phase machine is shifted with respect to that of the adjacent part by one-$n^{th}$ of the pole pitch, that is, by 360°/n/p (here, by 10°).

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. Apparatus, comprising:
   at least one permanent-magnet switched-flux (PMSF) device having:
     an outer rotor mounted to a shaft about a central axis extending axially through the PMSF device;
     a first plurality of permanent-magnets mounted in a first permanent magnet circle radially outwardly in a first transverse plane extending transversely from a first section of the central axis adjacent to an inner surface of the outer rotor;
     a second plurality of permanent-magnets mounted in a second permanent magnet circle radially outwardly in a second transverse plane extending transversely from a second section of the central axis adjacent to the inner surface of the outer rotor; and
     an inner stator coupled to the shaft and comprising:
       a stator core having a core axis co-axial with the central axis;
       a first plurality of stator poles mounted in a first stator pole circle radially outwardly from the stator core axis in the first transverse plane; and a second plurality of stator poles mounted in a second stator pole circle radially outwardly from the stator core axis in the second transverse plane, said first plurality of permanent-magnets and said second plurality of permanent-magnets each comprising permanent magnets of alternating polarity from one permanent-magnet to an adjacent permanent-magnet in the corresponding plurality of permanent-magnets.

2. The apparatus of claim further comprising a coil disposed on the inner stator between the first plurality of stator poles and the second plurality of stator poles, wherein the coil is coupled to the first and second pluralities of permanent-magnets, wherein a magnetic flux of the first and second pluralities of permanent-magnets is operable to pass through the coil, and wherein the magnetic flux is configured to switch to an opposite direction in response to a rotation of the outer rotor.

3. The apparatus of claim 2, further comprising an external power source in power supply communication with the coil.

4. The apparatus of claim 2, wherein the at least one PMSF device is a plurality of PMSF devices, the apparatus further comprising a wind turbine assembly coupled to the shaft.

5. The apparatus of claim 4, further comprising an external power source in power supply communication with the coil.

* * * * *

UNITED STATES PATENT AND TRADEMARK OFFICE
CERTIFICATE OF CORRECTION

PATENT NO. : 7,960,887 B2  
APPLICATION NO. : 12/686264  
DATED : June 14, 2011  
INVENTOR(S) : Trzynadlowski et al.

It is certified that error appears in the above-identified patent and that said Letters Patent is hereby corrected as shown below:

On the title page, under item (73) Assignee, delete "Board of Regents of the Nevada System Higher Education", and insert --Board of Regents of the Nevada System of Higher Education on Behalf of the University of Nevada, Reno--;

Column 2, line 43, delete "flax", and insert --flux--; and

In claim 2, column 9, line 10, delete "claim further", and insert --claim 1, further--.

Signed and Sealed this
Sixteenth Day of August, 2011

David J. Kappos
*Director of the United States Patent and Trademark Office*